Jan. 9, 1962 C. E. SUMMERS 3,016,051
FUEL VAPORIZATION MEANS FOR INTERNAL COMBUSTION ENGINES
Filed Aug. 3, 1959 2 Sheets-Sheet 1

INVENTOR.
CALEB E. SUMMERS
BY
ATTORNEYS

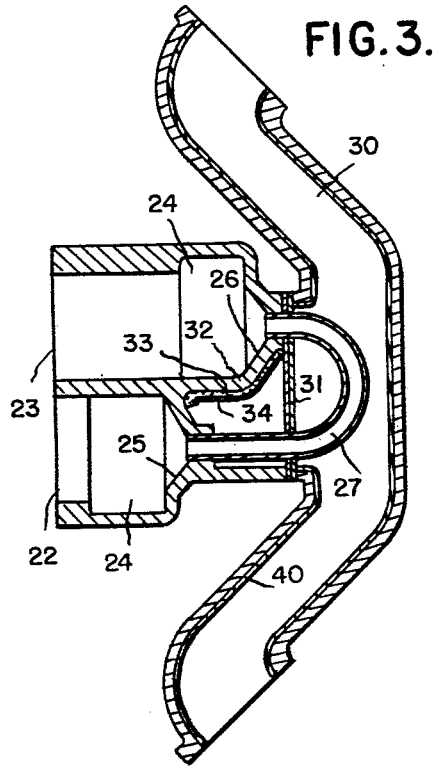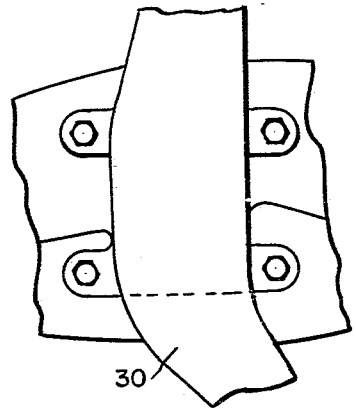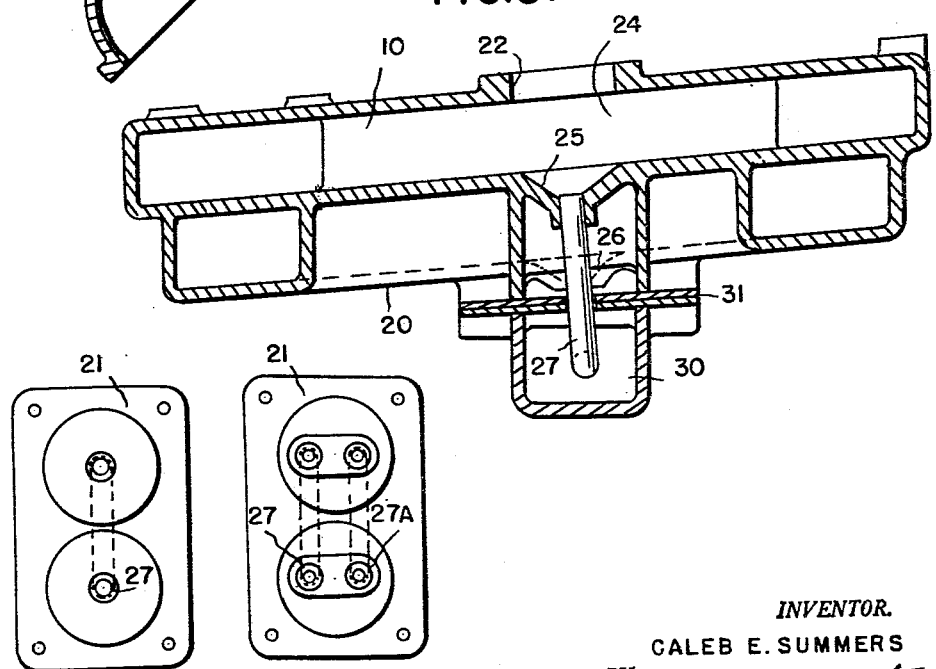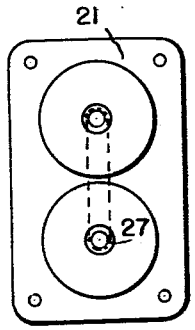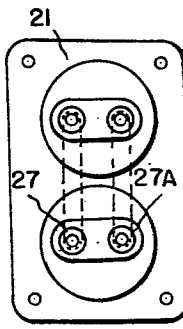

United States Patent Office 3,016,051
Patented Jan. 9, 1962

3,016,051
FUEL VAPORIZATION MEANS FOR INTERNAL COMBUSTION ENGINES
Caleb E. Summers, Orchard Lake, Mich.
Filed Aug. 3, 1959, Ser. No. 831,346
1 Claim. (Cl. 123—122)

The present invention relates to internal combustion engines and specifically to methods of and means for controlling the heating of fuel charges supplied thereto, and more specifically to the application of such means and methods to engines of the V-type.

In internal combustion engines, a considerable part of the presently used fuels passes into the manifold through the carburetor as droplets of liquid fuel, only a portion of the fuel being vaporized. And, since such a foggy mixture of air, gaseous fuel and fog presents problems of distribution and other difficulties, it is customary to provide means for heating such mixtures from the exhaust of the engine, using so-called "hot spots." These involve rather heavy castings of several pounds of metal and are consequently slow in heating and will not fluctuate to provide proper heating to accord with theh operating conditions and their changes. Such "hot spots" are usually a compromise and result in too little heating for part load operation and too much heating for full load conditions.

Among the objects of the present invention is a method of and means for vaporization of the liquid portion of fuel charges for internal combustion engines through the use of exhaust heat in which the heating effect varies with load conditions.

Another object is means for exhaust heating in which such variation is accomplished without moving parts, such as thermostats or the like.

Another object is to provide for vaporization of the liquid portion of the mixture without directly heating the air or vapor.

Another object is to provide for such vaporization without sensibly heating the carburetor and thus guard against vapor lock.

Another object is to provide for completing the vaporization of the fuel before the mixture arrives at the branching of the manifold and thereby attain a more perfect distribution.

Still other objects and advantages will readily appear to those skilled in the art upon reference to the following description and the accompanying drawings in which FIG. 1 is a top plan view of a V-eight manifold involving the invention.

FIG. 3 is a section on line 3—3 of FIG. 1.

FIG. 4 shows a detail of the construction.

FIG. 5 is a section on line 5—5 of FIG. 1.

FIG. 6 is a plan view of the carburetor attaching pad.

FIG. 7 is a view similar to FIG. 6 but of a modified construction.

Figure 1:
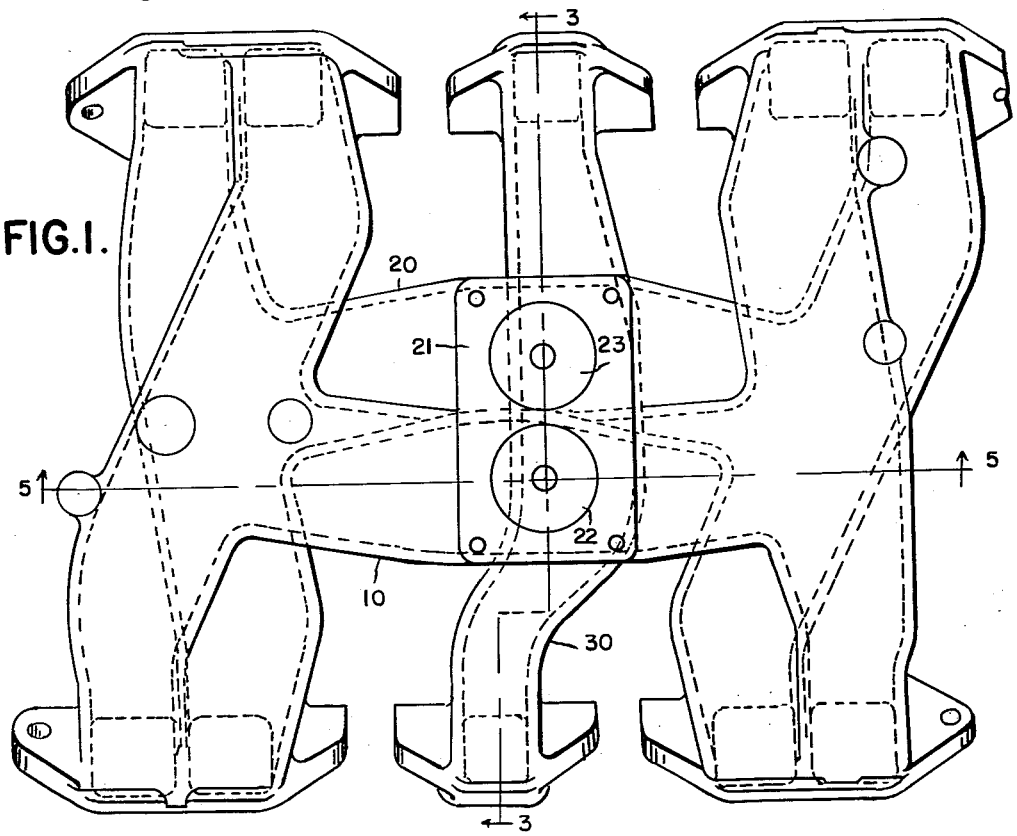
Figure 2:
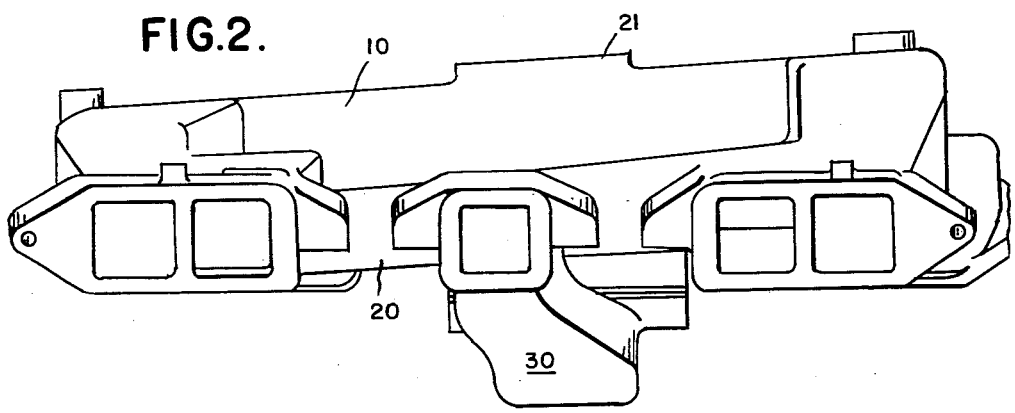
FIG. 2 is a side elevation as from the bottom of FIG. 1.

In the drawings, there is shown an intake manifold for an eight cylinder V-type engine of conventional design. It consists of two portions separate from each other functionally through constituting a single casting.

In the present invention, while a manifold of conventional design is shown and will be utilized, it is important that the two portions have substantially the same internal volume to obtain full benefit of the operation of the invention. The "conventional" design should, therefore, be modified to this extent, if necessary.

As will be noted, the two longitudinal portions 10 and 20 open at their ends to the branches extending to the several cylinders, portion 10 leading to two cylinders in each bank while the same is true of the portion 20.

At 21 is shown a suitable pad for mounting a carburetor (not shown) which in the present instance is a known form of so called "two barrel" carburetor. As shown, the pad 21 is provided with two wells 22 and 23, each provided at opposite sides with openings 24 so that each well is a part of the longitudinal portion 10 or 20 of the manifold.

At each well and coaxial therewith the bottom wall of each manifold is provided with a preferably conical basin shown at 25 and 26 (FIG. 3) which basins are connected together by a thin walled metal U-tube 27. At 30 is shown a conduit leading directly from the exhaust of one cylinder bank to the other and provided at its mid portion with an opening into which extends the U-tube 27.

As shown in FIGS. 3 and 5, the conduit 30 is fixed to the intake manifold structure with an intervening heat insulating gasket 31 and, since a considerable portion of the well 23 would be exposed to the exhaust gases traveling around the tube 27, the wall portion 32 of well 23 is covered on that side toward the hot exhaust with a heat resistant layer 33 of asbestos or other suitable material covered with a steel plate 34.

Further, in order to conserve heat particularly in the early stages of the warm-up, it is desirable to cover the inside wall of conduit 30 with coating of heat insulating material such as a suitable paint 40.

In the operation of the device, as the mixture comes from the carburetor, it will carry, along with the fine mist and vaporized fuel which flows readily into the manifold portions, a portion of the fuel in the form of droplets which, due to their inertia, will fall into the basins 25 and 26 and flow down into the tube 27 and be subjected to exhaust heat with the first firing of the cylinders. And, since the tube 27 is of thin heat conducting metal, vaporization immediately begins.

In starting, when there is considerable liquid fuel trying to enter the tube, the surges of air first in one direction and then the other, atomizes this liquid into the passing mixture.

In FIG. 7, is indicated the use of two tubes 27 and 27A if it is found that one tube does supply sufficient heat.

It should be noted that the present design allows for the omission of the conventional cast heat jacket around the intake manifold and thermostatic controls used in such construction. There is no bi-metal spring valve or shafting subjected to the exhaust gases.

It should also be noted that in the present device, it is only the hard to vaporize constituents that are subjected to heating.

Another advantage of the present design lies in the fact that if, as sometimes happens, a difference in fit of the throttle valves gives a richer mixture in one than in the other, the present arrangement tends to compensate for the difference because the vapor metered by one barrel goes to the manifold to which said barrel is attached, while any liquid goes to the U-tube, is vaporized and is delivered as vapor to the other manifold.

I claim:

An intake manifold for a V-type multi-cylinder internal combustion engine comprising a two-part manifold structure, each part disposed side by side and having oppositely extending longitudinally extending lateral portions connected with engine cylinders whereby each part services one-half of the engine cylinder, said manifold having a carburetor mounting having a pair of separate inlet ports each connected with a manifold part and disposed substantially medially of said longitudinally extending manifold portions and adapted for operable connection with a down draft two barrel carburetor, said manifold part provided with a recessed fuel condensate collecting well portion aligned with the inlet port, a by-pass conduit connecting said medial portions of said manifold parts and comprising a depending metallic U-tube connecting the recessed well portions, means for applying heat from the engine exhaust gases to said by-pass conduct comprising a lateral conduit connecting the exhaust manifolds of the banks of said cylinders of said V-type engine and which extends beneath said intake manifold parts, the U-tube extending within said lateral exhaust conduit in heat exchange relation with the exhaust gases therein, and an internal heat insulating lining for said lateral exhaust conduit.

References Cited in the file of this patent

UNITED STATES PATENTS

| | | |
|---|---|---|
| 2,633,114 | Summers | Mar. 31, 1953 |
| 2,640,471 | Haltenberger | June 2, 1953 |
| 2,759,462 | Haltenberger | Aug. 21, 1956 |
| 2,771,865 | Kolbe | Nov. 27, 1956 |